United States Patent
Young et al.

(10) Patent No.: US 11,791,855 B2
(45) Date of Patent: Oct. 17, 2023

(54) CONFIGURABLE ELECTRONIC WARFARE RADIO FREQUENCY RECEIVER

(71) Applicant: BAE Systems Information and Electronic Systems Intergration Inc., Nashua, NH (US)

(72) Inventors: Michael A. Young, Nashua, NH (US); Anthony J. Crawford, Milford, NH (US); Christopher M. Alix, Barrington, NH (US); Nathan Alix, Epsom, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/649,081

(22) Filed: Jan. 27, 2022

(65) Prior Publication Data
US 2023/0238993 A1    Jul. 27, 2023

(51) Int. Cl.
*H04B 1/18*    (2006.01)
*H04B 1/16*    (2006.01)
(Continued)

(52) U.S. Cl.
CPC ............. *H04B 1/18* (2013.01); *H04B 1/1027* (2013.01); *H04B 1/1607* (2013.01); *H04B 1/709* (2013.01);
(Continued)

(58) Field of Classification Search
CPC . H04L 27/0008; H04L 25/4902; H04L 27/00; H04L 27/0004; H04L 27/18; H04L 27/2017; H04L 27/2637; H04L 27/34; H04L 7/0008; H04L 2027/0065; H04L 2027/003; H04L 1/0001; H04L 1/0054; H04L 1/006; H04L 1/18; H04L 1/205; H04L 2025/03414; H04L 25/0305; H04L 25/0307; H04L 25/497; H04L 27/0002;
(Continued)

(56) References Cited

U.S. PATENT DOCUMENTS 11,520,811 B1 * 12/2022 Neuman ................. G06F 9/546
2019/0324107 A1 * 10/2019 Robinson ................ G01S 7/021
(Continued)

OTHER PUBLICATIONS

"2 GHz to 18 GHz, Digitally Tunable, High-Pass and Low-Pass Filter", Analog Devices Product Paper, www.analog.com, 2021, 36 pages.

*Primary Examiner* — Golam Sorowar
(74) *Attorney, Agent, or Firm* — Finch & Maloney PLLC; Gary McFaline

(57) ABSTRACT

A radio frequency (RF) receiver includes a transceiver, a programmable logic device (PLD), and a digitally tunable high-pass and low-pass filter bank. The transceiver is configured to receive a mission data file (MDF) specifying a plurality of RF frequencies to be tuned by the receiver and to convert the MDF into a binary file. The PLD is configured to receive the binary file from the transceiver and, based on the binary file, to transmit one or more commands that cause the filter bank to enter a selected one of a plurality of predefined filter states corresponding to one or more of the RF frequencies. In operation, the receiver receives an input signal and the filter bank dynamically filters the input signal in response to the one or more commands from the PLD.

13 Claims, 7 Drawing Sheets

(51) Int. Cl.
  *H04B 1/709* (2011.01)
  *H04B 1/10* (2006.01)
  *H04B 1/7093* (2011.01)

(52) U.S. Cl.
  CPC ............... *H04B 2001/1072* (2013.01); *H04B 2001/70935* (2013.01)

(58) Field of Classification Search
  CPC ..... H04L 27/01; H04L 27/183; H04L 27/186; H04B 1/406; H04B 1/0003; H04B 1/40; H04B 1/28; H04B 1/525; H04B 1/0007; H04B 2201/70703; H04B 1/005; H04B 1/0475; H04B 1/1036; H04B 1/30; H04B 1/69; H04B 1/707; H04B 1/00; H04B 1/006; H04B 1/16; H04B 1/38; H04B 1/001; H04B 1/10; H04B 1/1027; H04B 2001/0491; H04B 7/0602; H04B 7/0854; H04B 7/0871; H04B 1/0028
  See application file for complete search history.

(56) References Cited

U.S. PATENT DOCUMENTS

| | | | |
|---|---|---|---|
| 2021/0218429 A1* | 7/2021 | Stuenkel | H03H 11/04 |
| 2022/0077879 A1* | 3/2022 | Husain | G06N 5/022 |

* cited by examiner

CONFIGURABLE ELECTRONIC WARFARE RADIO FREQUENCY RECEIVER

FIELD OF DISCLOSURE

The present disclosure relates to electronic warfare (EW) radio frequency (RF) receivers and receiver systems, and more particularly, to a configurable EW receiver.

BACKGROUND

Electronic warfare (EW) receivers are used to provide situational awareness about radar systems and other emitters, such as radios or data links, in an RF environment. An EW receiver detects and collects signals from the RF environment and extracts parameters from the detected signals for identifying specific radar systems and their locations.

Figure 1:
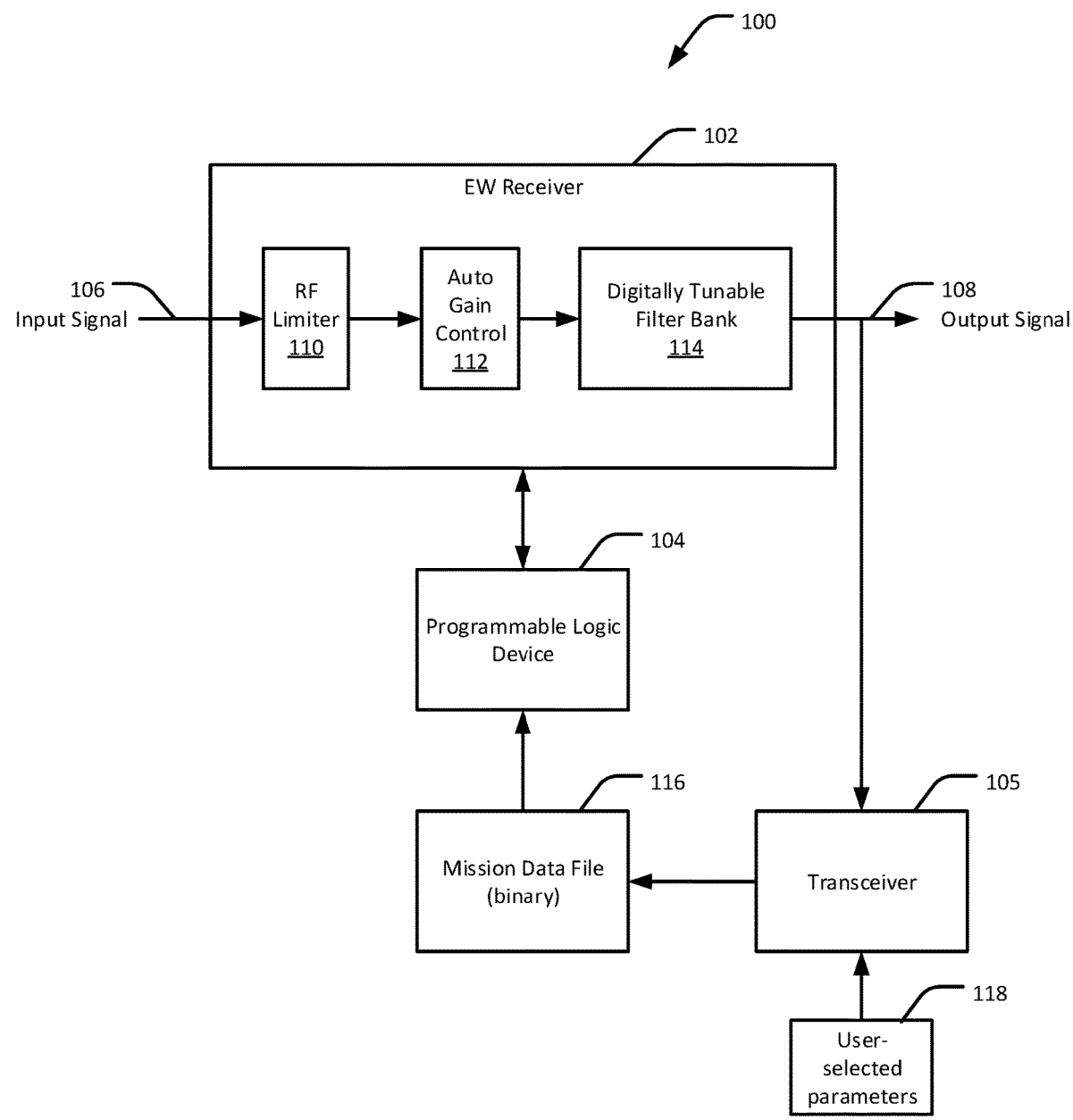
FIG. 1 is a block diagram of an example EW receiver system having a configurable wideband RF front end, in accordance with an embodiment of the present disclosure.

Although the following detailed description will proceed with reference being made to illustrative embodiments, many alternatives, modifications, and variations thereof will be apparent in light of this disclosure.

DETAILED DESCRIPTION

In accordance with an embodiment of the present disclosure, a radio frequency (RF) receiver includes a transceiver, a programmable logic device (PLD), and a digitally tunable high-pass and low-pass filter bank. The transceiver is configured to receive a mission data file (MDF) specifying a plurality of RF frequencies to be tuned by the receiver and to convert the MDF into an executable (e.g., the transceiver extracts the values encoded in the MDF and creates a binary file that is passed to the PLD). The PLD is configured to receive the executable (e.g., the binary file) from the transceiver and, based on the executable, to transmit one or more commands that cause the filter bank to enter a selected one of a plurality of predefined filter states corresponding to one or more of the RF frequencies. In operation, the receiver receives an input signal and the filter bank dynamically filters the input signal in response to the one or more commands from the PLD.

Overview

Some existing EW receivers have several fixed analog filter banks at the front end of the circuit for detecting signals and removing spurious content within several different frequency ranges. The filter banks are selectable by the receiver. For example, the receiver can select different filter banks as it scans through different frequency ranges for a signal. However, the performance of EW receivers, and more particularly, Small Form Factor (SFF) EW receiver architectures, are constrained by the number and size of the filter banks, which limit the ability of the receiver to observe the EW spectrum. For instance, some receiver architectures have a limited number of broad or narrowband filters on the RF front end and are thus constrained to receiving signals within those bands. While additional filters can be added to support different frequency bands, there are trade-offs between the number of filter banks and the ability to rapidly switch between the filter banks. In some cases, EW receivers are also limited by requirements relating to size, weight, power, and cost (SWaP C).

To this end, and in accordance with an embodiment of the present disclosure, an EW receiver with a configurable wideband RF front end is disclosed. The wideband RF front end provides both wideband and narrowband filtering. For example, the RF front end can receive signals across multiple octaves (for example, octaves in the range of 2 to 24 GHz) with front end limiting, pre-select filtering, and automatic gain control (AGC) within an SFF package. According to some embodiments, the RF front end can be configured with a Mission Data File (MDF) to rapidly perform frequency hopping of different RF filters from a wideband 22 GHz bandwidth to approximately 0.5 GHz bandwidth within approximately 300 nanoseconds.

In accordance with some embodiments, the EW receiver can rapidly transition from an initial wideband observation of the EW spectrum to a narrowband observation using a digitally tunable filter bank, which improves detection performance. For example, the receiver is configured to observe multiple frequency octaves and then rapidly select one or more frequencies of interest in the order of nanoseconds, according to predefined parameters specified by the MDF. The RF front end is configurable for selecting signals of interest and is adaptable to existing receivers without substantial changes to the physical architecture of the system. The EW receiver removes the need for custom filters and filter banks, which reduces costs and helps maintain a high level of performance without the need to redesign the entire system. For example, the RF front end can be implemented with existing signal processing systems, including EW receivers and transceivers, while maintaining a relatively small size, relatively low weight, and relatively low power consumption without significant performance degradation. Numerous configurations and variations and other example use cases will be appreciated in light of this disclosure.

Example EW Receiver System

FIG. 1 is a block diagram of an example EW receiver system 100 having a configurable wideband RF front end, in accordance with an embodiment of the present disclosure. The system 100 includes an EW receiver 102, a programmable logic device (PLD) 104, and a transceiver 105. The EW receiver 102 includes an RF limiter 110, an automatic gain control (AGC) module 112, and a digitally tunable filter bank 114. The EW receiver 102 is configured to receive an input signal 106 and to generate an output signal 108. The PLD 104 is used to control the filter bank 114 using an MDF 116. In some examples, the MDF 116 points to addresses within the filter bank 114 to dynamically select filter operational parameters, such as for tuning to the frequencies that are permitted to pass through the filter bank 114 to the transceiver 105 via the output signal 108.

For example, the system 100 operates as follows. The system 100 receives, via the input signal 106, an external RF signal via an antenna, filters the RF signals, and outputs the filtered signals via the output signal 108 to the transceiver 105. The RF limiter 110 prevents damage to the system 100 caused by excessive power at the input. The AGC 112 prevents the EW receiver 102 from operating in saturation. The MDF 116 specifies which signals are to be filtered based on user-selected parameters 118, and the PLD 104 dynamically controls the filter bank 114 based on the MDF 116. The MDF 116 can include logic that is used by the PLD 104 to determine which frequencies to filter based on parameters stored in a lookup table (LUT) in the filter bank 114 or by directly commanding the filter bank 114 to enter or otherwise switch to a filtering state or configuration for filtering selected frequencies. The filter bank 114, in some examples, is an ADMV8818 2 GHz to 18 GHz, digitally tunable, high-pass and low-pass filter by Analog Devices, Inc., of Wilmington, Massachusetts. However, it will be appreciated that other commercially available, digitally tunable filter bank devices can be used in place of, or in addition to, the disclosed devices.

Figure 2:
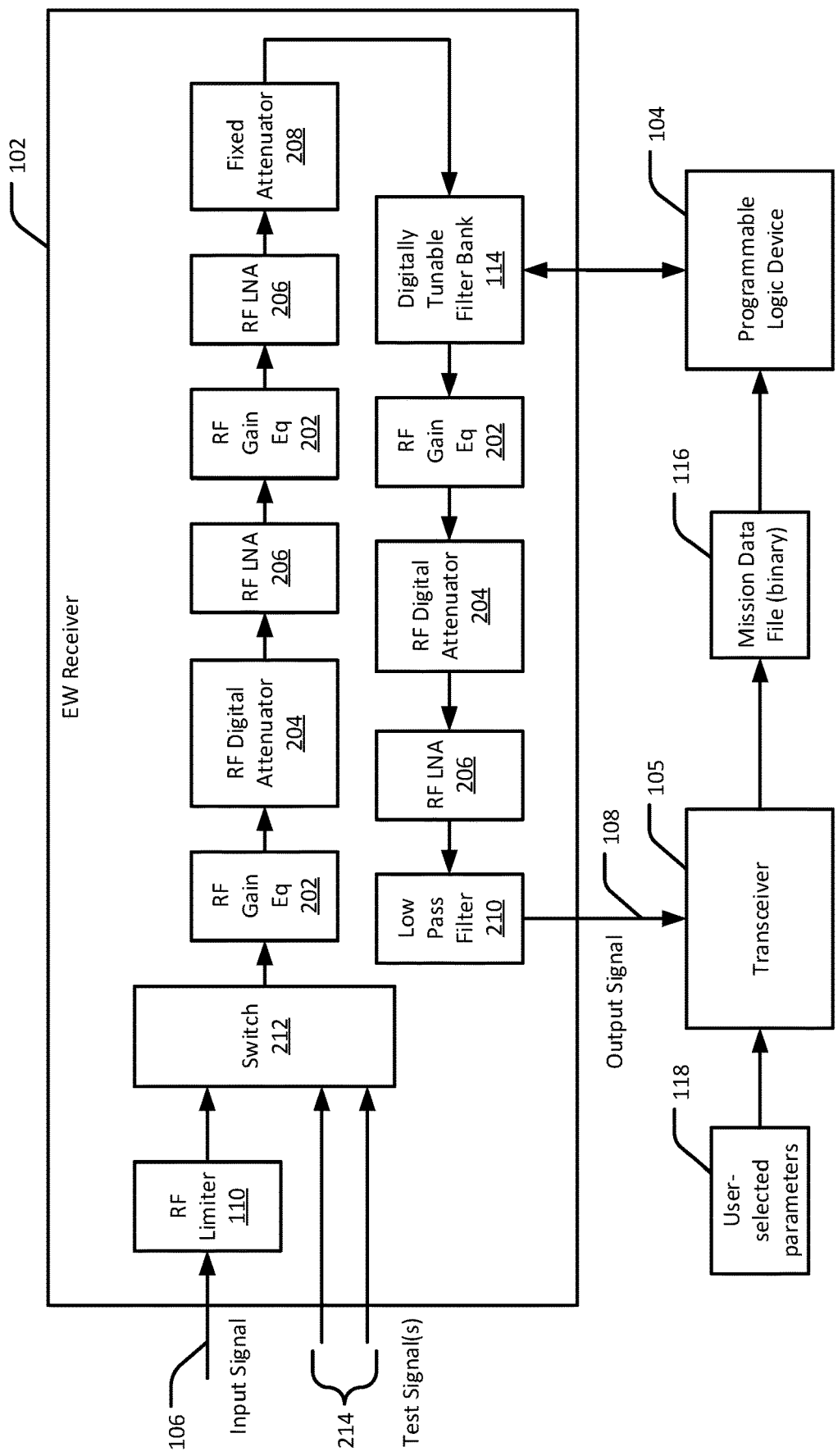
FIG. 2 is a block diagram of the EW receiver system of FIG. 1 in further detail, in accordance with an embodiment of the present disclosure.

FIG. 2 is a block diagram of the example EW receiver system 100 in further detail, in accordance with an embodiment of the present disclosure. The EW receiver 102 includes the RF limiter 110, one or more RF gain equalizers 202, one or more RF digital attenuators 204, one or more RF low noise amplifiers (LNA) 206, one or more fixed attenuators 208, the digitally tunable filter bank 114, and one or more low pass filters 210. In some examples, the EW receiver 102 further includes a test switch 212.

For example, such as shown in FIG. 2, the EW receiver 102 is arranged as follows. First, the RF limiter 110 receives the input signal 106. The RF limiter 110 is configured to prevent damage to low noise amplifiers due to excessive power at the input. Next, in some examples, the switch 212 is used to switch between the input signal 106 and one or more test input signals 214 that can be used for system testing purposes. For example, the switch 212 can be included to provide built-in test (BIT) functionality, where an upconverter or other device coupled to the output of the EW receiver system 100 feeds test signals back into the EW receiver 102. In some examples, the switch 212 is an RF single-pole, four-throw (SP4T) switch. It will be understood that, in some embodiments, the switch 212 can be excluded.

Next, the RF gain equalizer 202 is configured to compensate for module gain slope. For example, in some RF amplifiers, the gain decreases as a function of frequency. The RF gain equalizer 202 can compensate for the loss of gain caused by an increase in frequency, a decrease in frequency, or a combination of these (e.g., a parabolic gain slope as a function of frequency).

Next, the RF digital attenuator 204 provides automatic gain control (AGC 112) by attenuating (reducing the power of) the RF signal to prevent the EW receiver 102 from operating in saturation. Next, the RF LNA 206 increases the signal a sufficient level above the noise floor so that the signal can be used for additional processing. The RF LNA 206 effectively establishes the sensitivity limits of the EW receiver 102. Next, another RF gain equalizer 202 again compensates for module gain slope. Next, another RF LNA 206 again increases the signal a sufficient level above the noise floor so that the signal can be used for additional processing. Next, the fixed attenuator 208 is a passive gain device that decreases power within the signal path.

Next, the filter bank 114 has a plurality of selectable filter states. For example, a user enters information into fields of the MDF 116, which is configurable. Upon saving the MDF fields, a binary file of that MDF is generated which contains all the specific parameters of operation. The binary file is then programmed onto a transceiver 212 (with firmware), which then operates according to the user-selected parameters 118. During operation, the PLD 104 (e.g., a complex program logic device or CPLD) receives commands over a communication channel, such as a universal asynchronous receiver-transmitter (UART). The commands point to specific addresses in the filter bank 114 and contain data that is sent to each component in the EW receiver 102. In parallel, commands specific to the filter bank 114 are sent over a serial peripheral interface (SPI) from the PLD 104. The commands can, for example, specify all filter states (either within the command or addresses to filter states stored in a LUT) and include a pointer to the first state upon initial operation of the EW receiver 102, after a command is sent to enable changing of filter states by cycling through the states stored in the LUT or by changing to specific states.

For example, commands to change the filter state can be continuously sent from the PLD 104 to the filter bank 144 to constantly change the filter state. Alternatively, the filter states can be preloaded into an LUT of the filter bank 114. In this case, the filter state is changed by final commands sent from the transceiver 105 to the PLD 104. The PLD 104 then sends a command including the address within the LUT where the filter selections will be cycled. The filter bank 114 can be configured to operate in a fixed state or to cycle between multiple states.

Next, another RF gain equalizer 202 again compensates for module gain slope. Next, another RF digital attenuator 204 provides AGC by again attenuating the RF signal. Next, another RF LNA 206 again increases the signal a sufficient level above the noise floor so that the signal can be used for additional processing. Next, the low pass filter 210 filters out high frequency RF signals outside the frequency band of interest.

Example MDF Filter Programming Methodology

Figure 3:
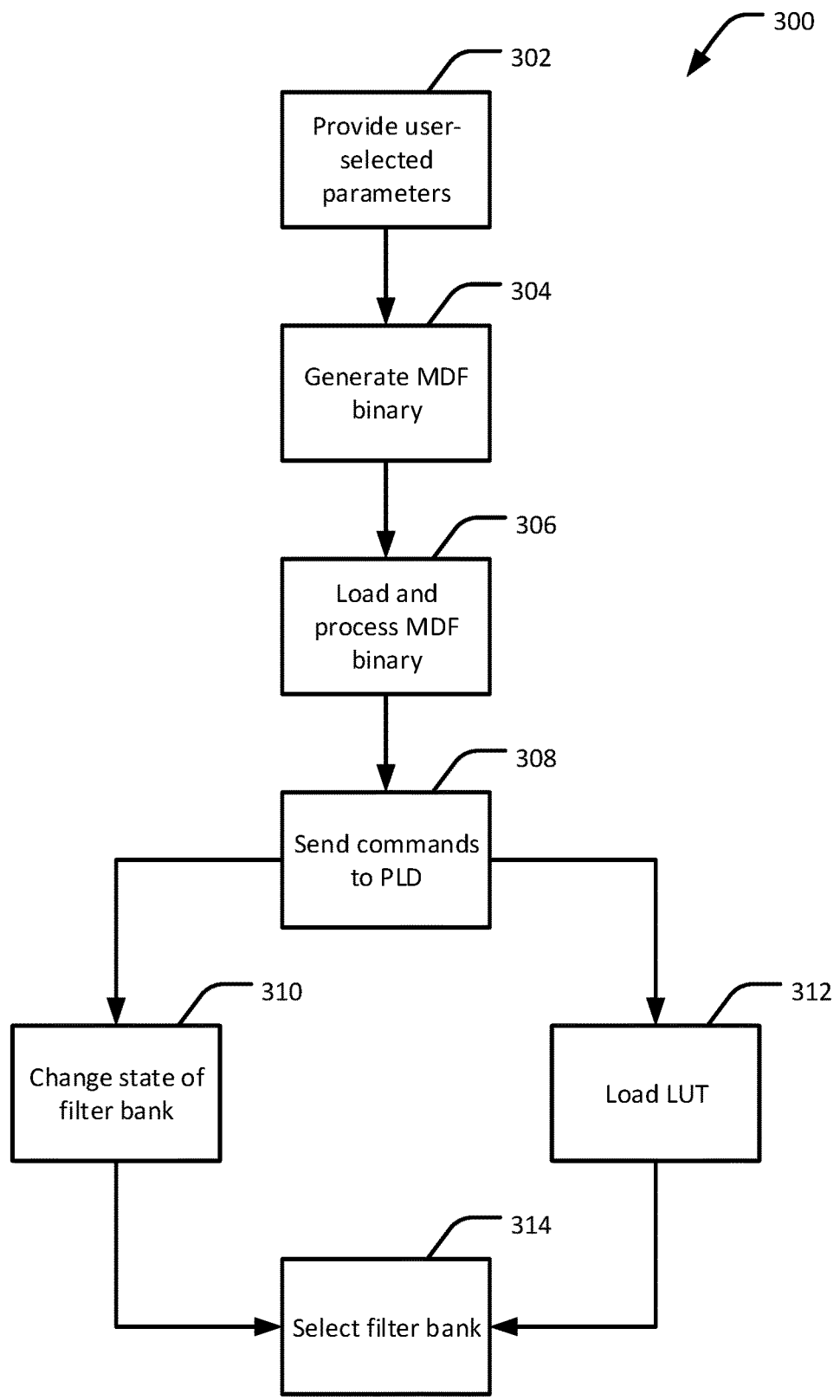
FIG. 3 is a flow diagram of an example filter programming method for the EW receiver system of FIG. 1, in accordance with an embodiment of the present disclosure.

FIG. 3 is a flow diagram of an example filter programming method 300 for an EW receiver, in accordance with an embodiment of the present disclosure. The method 300 can be implemented, for example, in the system 100 of FIG. 1, for programming the system 100 to perform signal filtering in accordance with the MDF. The user-selected parameters 302 are provided to the transceiver 105 via a computer or other user terminal. For example, the user-selected parameters 302 can be stored in fields of the MDF as plain text, with the fields delimited by tabs, commas, or other delimiters, such as specified by MIL-STD-3014 "Department of Defense Interface Standard for Mission Data Exchange Format" (Feb. 20, 2004, et seq.). The fields can contain a list of frequencies that are to be tuned by the EW receiver 102. The transceiver 105 generates 304 an MDF binary (e.g., filter values) based on the user-selected parameters, such as specified by MIL-STD-3014. The MDF binary is loaded and processed 306 by the transceiver 105, which sends 308 commands (e.g., the user-selected parameters) to the PLD 104. The PLD 104, in turn, sends single or multiple steaming commands to the filter bank 114 that change 310 the state of the filter bank 114 (e.g., select one or more filters), or, alternatively, load 312 the user-selected parameters into a LUT of the filter bank 114, which causes the state of the filter bank 114 to change 314 by modifying a pointer into the LUT. For example, operational states of the filter bank 114 can be defined by the user-selected parameters, loaded into registers of the PLD 104, and then pushed to the filter bank 114 as single instructions or as a stream of instructions. In another example, the various filter states (e.g., up to 128 states) can be specified in firmware to be loaded into the internal LUT of the filter bank 114 upon initialization and startup of the PLD 104. A pointer in the LUT can be set via the MDF or single instruction commands from the PLD 104. The pointer can then be changed to hop through the LUT, which causes the filter bank 114 to down-select from filtering a wideband frequency range to a narrowband frequency range.

In another example, there can be any number of states, based on the design of the filter bank 114. For instance, individual instruction commands specifying the filter states or other operational parameters, as specified by the MDF and/or the PLD 104 firmware, can be sent from the PLD 104 to the filter bank 114 without using (or in addition to using) the states stored in the LUT.

Example RF Signal Processing Methodology

Figure 4:
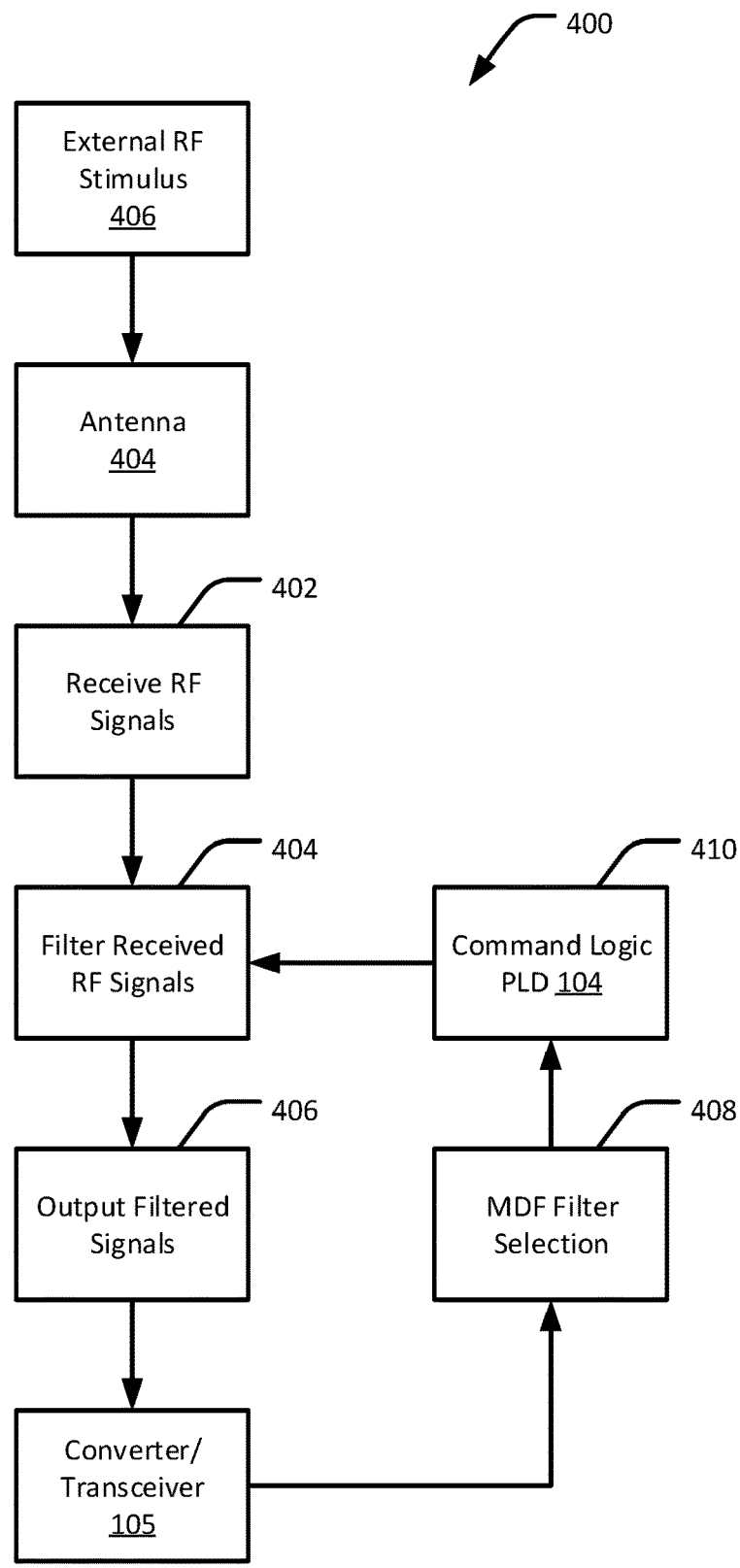
FIG. 4 is a flow diagram of an example RF signal processing methodology for the EW receiver system of FIG. 1, in accordance with an embodiment of the present disclosure.

FIG. 4 is a flow diagram of an example RF signal processing methodology 400 for an EW receiver, in accordance with an embodiment of the present disclosure. The methodology 400 can be implemented, for example, in the system 100 of FIG. 1 for filtering RF signals. The methodology 400 includes receiving 402 an RF signal from an antenna 404 that is configured to detect an external RF stimulus 406, such as a waveform or frequency emitted by a radar system. The RF signal is filtered 404 such that certain frequencies are permitted to pass through, while other frequencies are blocked, or where the filter is bypassed such that all RF signals are passed through. The filtered RF signal is then output 406 to a device, such as an analog-to-digital converter or a transceiver, such as the transceiver 105 of FIG. 1.

As discussed with respect to FIG. 3, the transceiver 105 can be programmed using an MDF, which specifies which filters of the filter bank 114 are selected. As the filtered RF signal is received by the transceiver 105, the filters of the filter bank 114 are selected 408 according to the user-selected parameters of the MDF using command logic 410 that is programmed into the PLD 104 and sent by the PLD 104 to the filter bank 114. For example, the command logic 410 can be configured to point to various addresses within the filter bank 114, as specified by the MDF, to dynamically change the filter parameters during operation. Further detail is provided with respect to FIG. 5.

Figure 5:
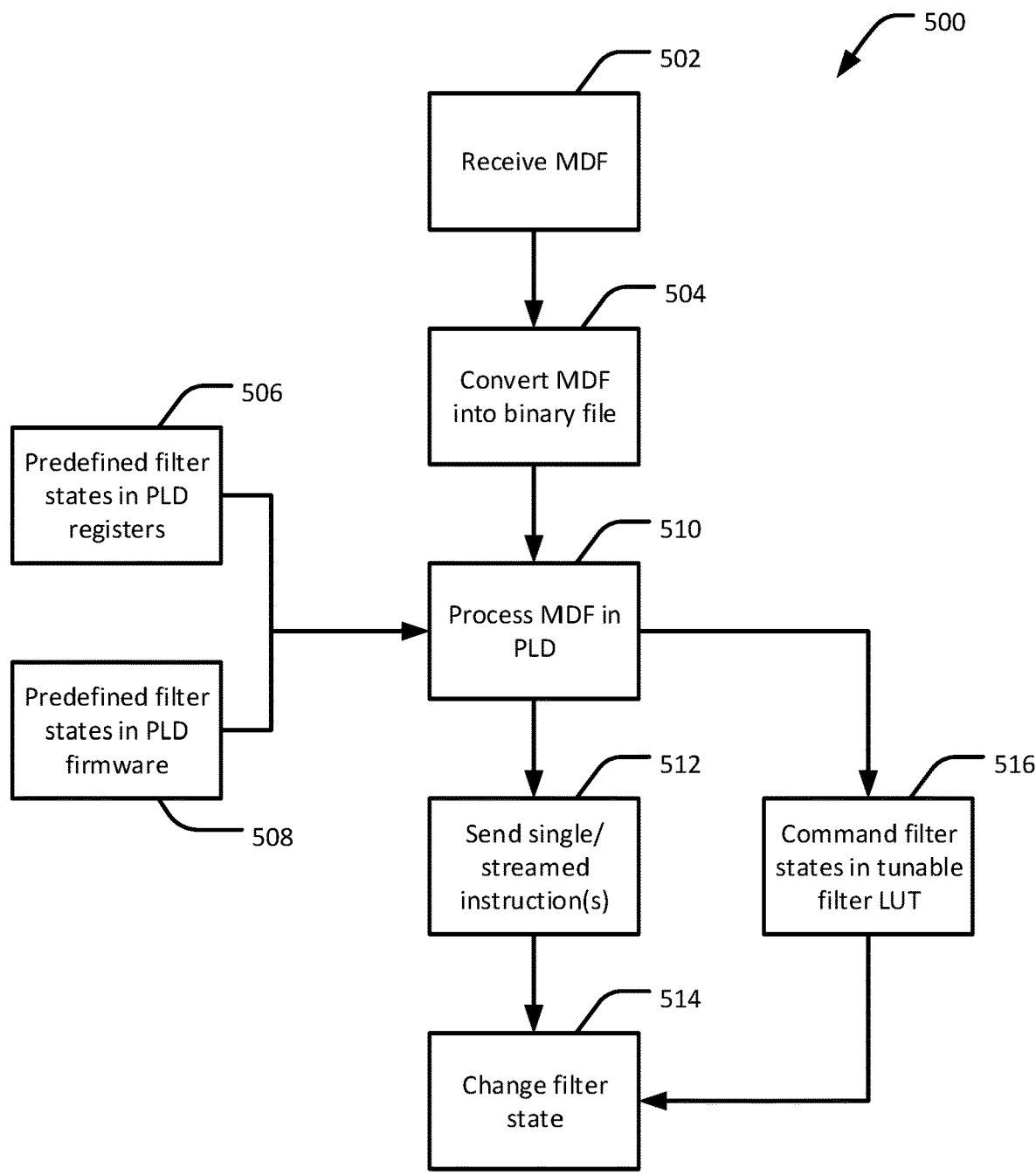
FIG. 5 is a flow diagram of an example EW receiver methodology, in accordance with an embodiment of the present disclosure.

FIG. 5 is a flow diagram of an example EW receiver methodology 500, in accordance with an embodiment of the present disclosure. The methodology 500 includes receiving 502 the MDF. As noted above, the MDF can specify, according to user-selected parameters, frequencies to be tuned by the EW receiver 102, and more particularly, which frequencies are to be tuned under certain logic conditions. The MDF, which in some examples can be a plain text file, is converted 504 by the receiver into an MDF binary file for processing by the PLD. Additionally, filter states that cause the tunable filter 114 to tune certain frequencies are predefined in registers 506 of the PLD or, alternatively, in firmware 508 that is loaded from the receiver into the PLD. For example, the tunable filter 114 can include multiple different filter states, each of which causes the tunable filter 114 to filter different frequencies. By selecting one of the filter states, the tunable filter 114 will filter the frequencies associated with the selected state. Furthermore, the tunable filter 114 can be configured to switch states upon receiving commands from the PLD to enter a particular state or upon receiving commands from the PLD to change states as stored in an internal LUT (e.g., by advancing a pointer in the LUT).

The MDF executable (e.g., binary file) is then processed 510 by the PLD. During processing, the PLD can send 512 single instructions, or a stream of instructions, commanding the tunable filter 114 to enter the predefined filter states (either stored in registers of the PLD or in the PLD firmware), which causes the tunable filter to change filter states 514 accordingly. Alternatively, the PLD can command 516 the tunable filter to enter one of the filter states stored in a LUT of the tunable filter, which also causes the tunable filter to change filter states 514.

Figure 6:
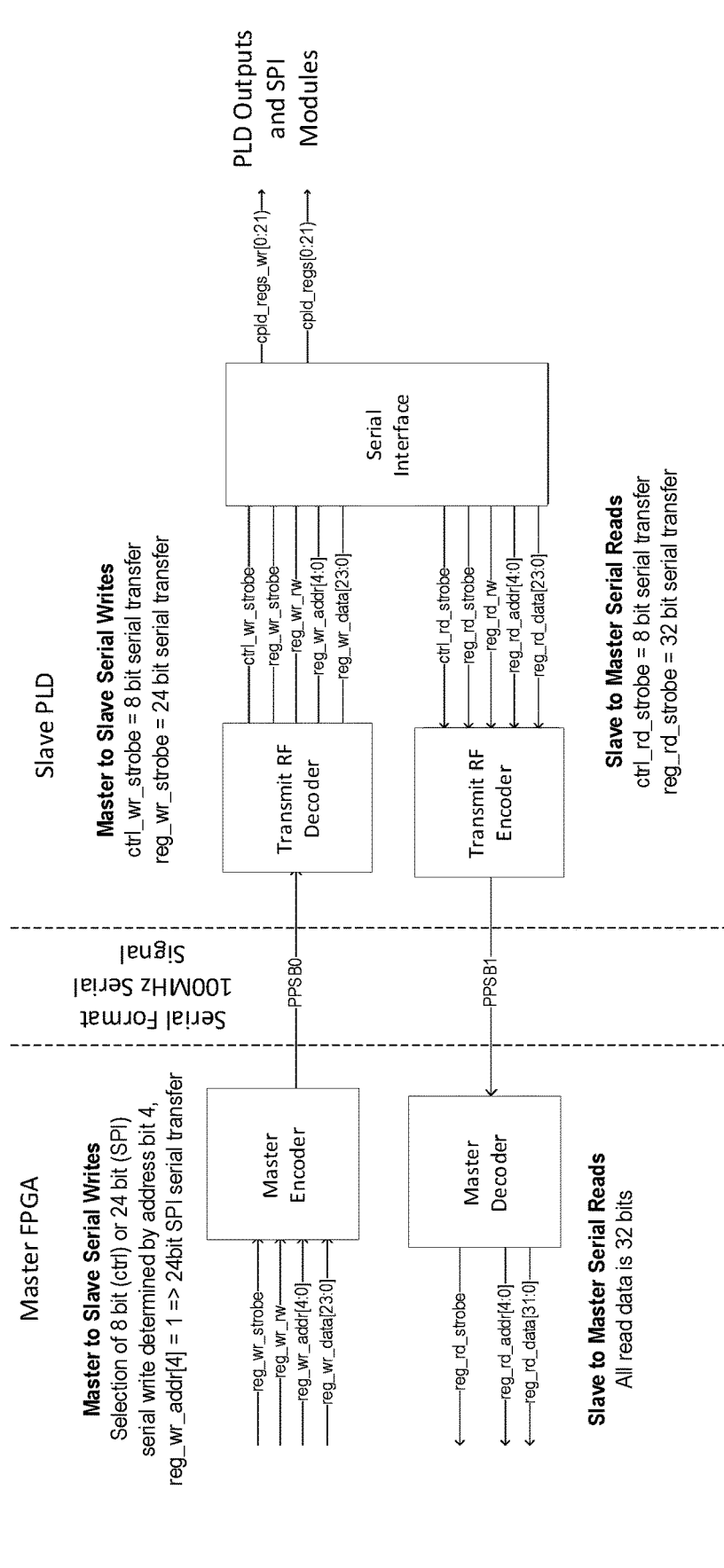
FIG. 6 is a block diagram of an example communication scheme for sending and receiving commands between components of the EW receiver system of FIG. 1, in accordance with an embodiment of the present disclosure.

FIG. 6 is a block diagram of an example communication scheme for sending and receiving commands, in accordance with an embodiment of the present disclosure. FIG. 6 shows firmware UART blocks for communicating serial data from a master FPGA, which is part of the transceiver 105, in some example. The serial data is transmitted over a set of dedicated lines (through a connector) to a slave PLD (e.g., PLD 104) that contains the register map for communicating to the components of the EW receiver system 100, including the filter bank 114. In some examples, a high-speed UART is configured to send a bit approximately every 10 nanoseconds. Data that is sent from the master FPGA to the slave PLD occurs on a point-to-point serial bus 0 (PPSB0). Data that is sent from the slave PLD to the master FPGA occurs on a point-to-point serial bus 1 (PPSB1). This allows for communications and data, such as the single instructions, or a stream of instructions, commanding the tunable filter 114 to enter the predefined filter states (either stored in registers of the PLD or in the PLD firmware), to be sent and received digital between the transceiver 105 and the PLD 104.

Figure 7:
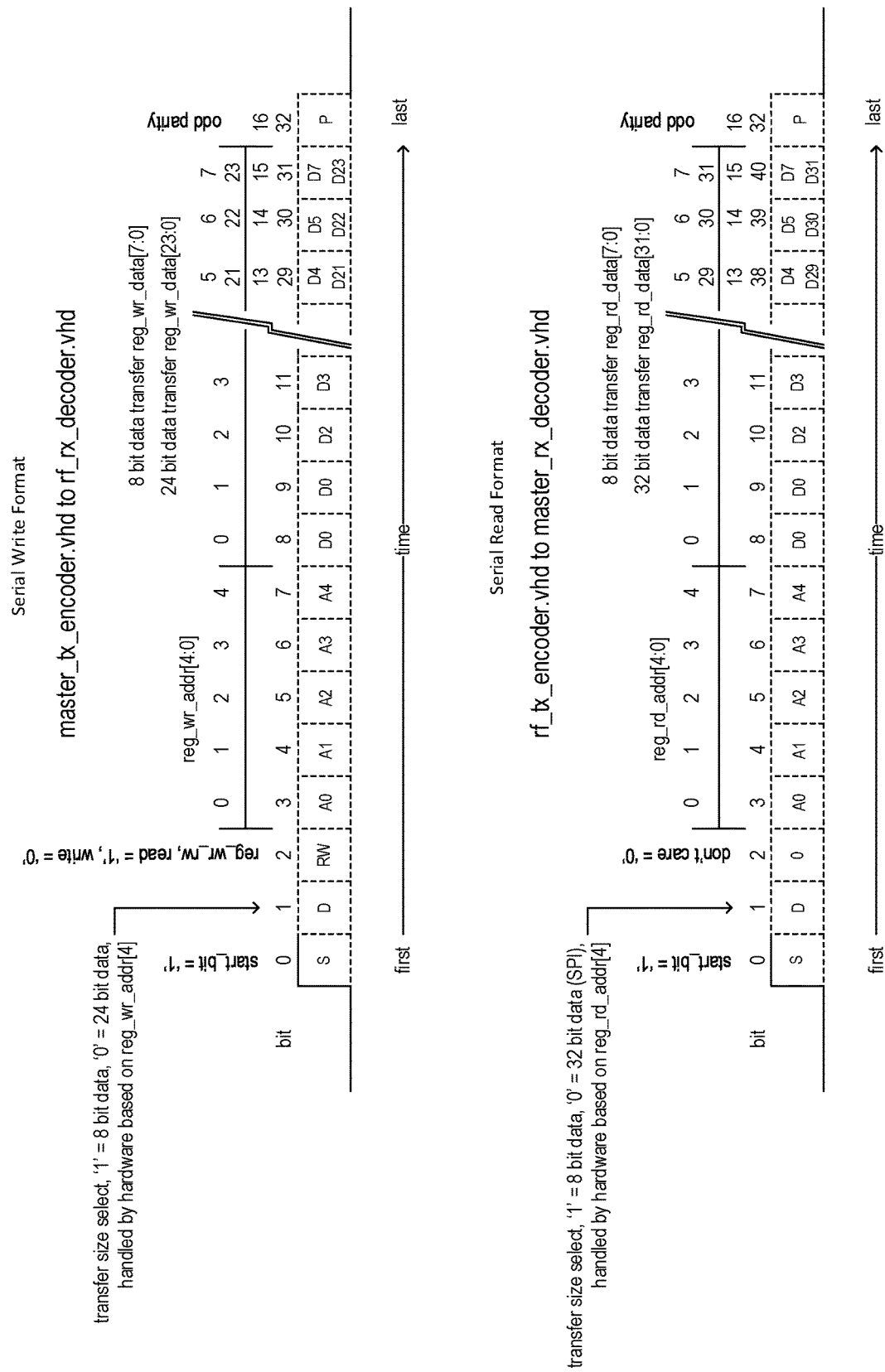
FIG. 7 is a block diagram of an example communication scheme for serial communications to and from registers of a programmable logic device of the EW receiver system of FIG. 1, in accordance with an embodiment of the present disclosure.

FIG. 7 is a block diagram of an example communication scheme for serial communications to and from registers of the PLD 104, in accordance with an embodiment of the present disclosure. For example, FIG. 7 shows the serial write format of the data being sent and received across PPSB0 and PPSB1. In this format, the data is located between start bits. The format includes a transfer size of the data being sent, whether the data is being read or written, what address is being read or written to, and the data being sent or received. An example format supports 8, 24, or 32 bits of data. However, it will be appreciated that different formats can be configured for a use with particular application.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional structures that include hardware, or a combination of hardware and software, and may comprise, for example, singly or in any combination, hardwired circuitry, programmable circuitry such as computer processors comprising one or more individual instruction processing cores, state machine circuitry, and/or gate level logic. The circuitry may include a processor and/or controller programmed or otherwise configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. In some examples, the firmware can be developed using Very High Speed Integrated Circuits (VHSIC) Hardware Description Language (VHDL). The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable device. In any such hardware cases that include executable software, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 provides a radio frequency (RF) receiver including a transceiver configured to receive a mission data file (MDF) specifying a plurality of RF frequencies to be tuned and to convert the MDF into a binary file; a programmable logic device (PLD) configured to receive the binary file from the transceiver and, based on the binary file, to transmit one or more commands that cause a digitally tunable high-pass and low-pass filter bank to enter a selected one of a plurality of predefined filter states corresponding to one or more of the RF frequencies; an input configured to receive an input signal; the filter bank coupled to the input and the PLD, the filter bank configured to dynamically filter the input signal in response to the one or more commands from the PLD; and an output configured to output the filtered input signal to a device.

Example 2 includes the subject matter of Example 1, wherein the transceiver is configured to load the predefined filter states into one or more registers of the PLD and/or load the predefined filter states into a firmware of the PLD.

Example 3 includes the subject matter of any of Examples 1 and 2, wherein the one or more commands include a command with an instruction for the filter bank to enter the selected predefined filter state.

Example 4 includes the subject matter of any of Examples 1-3, wherein the PLD is configured to transmit the predefined filter states to a lookup table of the filter bank.

Example 5 includes the subject matter of any of Examples 1-4, wherein the one or more commands include a command that causes the filter bank to select one of the predefined filter states from the lookup table.

Example 6 includes the subject matter of any of Examples 1-5, wherein selecting one of the predefined filter states causes the filter bank to tune an approximately 22 GHz bandwidth signal, and wherein selecting another one of the predefined filter states causes the filter bank to tune an approximately 0.5 GHZ bandwidth signal.

Example 7 includes the subject matter of Example 6, wherein the filter bank is configured to switch between two different predefined filter states within approximately 300 nanoseconds.

Example 8 provides a method of receiving a radio frequency (RF) signal. The method includes receiving a mission data file (MDF) specifying a plurality of RF frequencies to be tuned; converting the MDF into a binary file configured to be processed by a programmable logic device (PLD); loading, using the binary file, predefined filter states corresponding to the RF frequencies into the PLD; receiving an input signal via an input; receiving, from the PLD, one or more commands that cause a digitally tunable high-pass and low-pass filter bank coupled to the input to enter a selected one of the predefined filter states based on the MDF, thereby filtering the input signal; and providing the filtered input signal to a device.

Example 9 includes the subject matter of Example 8, wherein loading the predefined filter states into the PLD comprises loading the predefined filter states into one or more registers of the PLD and/or loading the predefined filter states into a firmware of the PLD.

Example 10 includes the subject matter of any of Examples 8 and 9, wherein the one or more commands include a command with an instruction for the filter bank to enter the predefined filter state.

Example 11 includes the subject matter of any of Examples 8-10, further including transmitting the predefined filter states to a lookup table of the filter bank.

Example 12 includes the subject matter of Example 11, wherein the one or more commands include a command that causes the filter bank to select the selected predefined filter state from the lookup table.

Example 13 includes the subject matter of any of Examples 8-12, wherein at least one of the predefined filter states causes the filter bank to tune an approximately 22 GHz bandwidth signal, and wherein at least another one of the predefined filter states causes the filter bank to tune an approximately 0.5 GHZ bandwidth signal.

Example 14 provides a radio frequency (RF) receiver. The RF receiver includes an input configured to receive an input signal; an RF limiter coupled to the input and configured to limit a power of the input signal; a gain control module coupled to the RF limiter and configured to dynamically adjust a gain of the input signal; a digitally tunable high-pass and low-pass filter bank coupled to the gain control module and configured to dynamically filter the input signal according to a predefined set of parameters; and an output configured to output the filtered input signal.

Example 15 includes the subject matter of Example 14, further including a switch coupled between the RF limiter and the gain control module, the switch configured to switch between the input signal and one or more test signals.

Example 16 includes the subject matter of any of Examples 14 and 15, wherein the gain control module comprises an RF gain equalizer, an RF digital attenuator, an RF low noise amplifier, and/or a fixed attenuator.

Example 17 includes the subject matter of any of Examples 14-16, further including a low pass filter coupled to the output.

Example 18 includes the subject matter of any of Examples 14-17, further comprising a programmable logic device (PLD) configured to control the filter bank according to the predefined set of parameters.

Example 19 includes the subject matter of Example 18, further comprising a transceiver coupled to the output and to the PLD, the transceiver configured to generate the predefined set of parameters based on a mission data file (MDF).

Example 20 includes the subject matter of any of Examples 14-19, wherein the RF limiter, the gain control module, and the filter bank are integrated into a small form factor (SFF) package.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A radio frequency (RF) receiver comprising:
a transceiver configured to receive a mission data file (MDF) specifying a plurality of RF frequencies to be tuned and to convert the MDF into a binary file;
a programmable logic device (PLD) configured to receive the binary file from the transceiver and, based on the binary file, to transmit one or more commands that cause a digitally tunable high-pass and low-pass filter bank to enter a selected one of a plurality of predefined filter states corresponding to one or more of the RF frequencies;
an input configured to receive an input signal;
the filter bank coupled to the input and the PLD, the filter bank configured to dynamically filter the input signal in response to the one or more commands from the PLD; and
an output configured to output the filtered input signal to a device.

2. The receiver of claim 1, wherein the transceiver is configured to load the predefined filter states into one or more registers of the PLD and/or load the predefined filter states into a firmware of the PLD.

3. The receiver of claim 1, wherein the one or more commands include a command with an instruction for the filter bank to enter the selected predefined filter state.

4. The receiver of claim 1, wherein the PLD is configured to transmit the predefined filter states to a lookup table of the filter bank.

5. The receiver of claim 1, wherein the one or more commands include a command that causes the filter bank to select one of the predefined filter states from the lookup table.

6. The receiver of claim 1, wherein selecting one of the predefined filter states causes the filter bank to tune an approximately 22 GHz bandwidth signal, and wherein selecting another one of the predefined filter states causes the filter bank to tune an approximately 0.5 GHZ bandwidth signal.

7. The receiver of claim 6, wherein the filter bank is configured to switch between two different predefined filter states within approximately 300 nanoseconds.

8. A method of receiving a radio frequency (RF) signal, the method comprising:
receiving a mission data file (MDF) specifying a plurality of RF frequencies to be tuned;
converting the MDF into a binary file configured to be processed by a programmable logic device (PLD);
loading, using the binary file, one or more predefined filter states corresponding to the RF frequencies into the PLD;
receiving an input signal via an input;
receiving, from the PLD, one or more commands that cause a digitally tunable high-pass and low-pass filter bank coupled to the input to enter a selected one of the predefined filter states based on the MDF, thereby filtering the input signal; and
providing the filtered input signal to a device.

9. The method of claim 8, wherein loading the predefined filter states into the PLD comprises loading the predefined filter states into one or more registers of the PLD and/or loading the predefined filter states into a firmware of the PLD.

10. The method of claim 8, wherein the one or more commands include a command with an instruction for the filter bank to enter the predefined filter state.

11. The method of claim 8, further comprising transmitting the predefined filter states to a lookup table of the filter bank.

12. The method of claim 11, wherein the one or more commands include a command that causes the filter bank to select the selected predefined filter state from the lookup table.

13. The method of claim 8, wherein at least one of the predefined filter states causes the filter bank to tune an approximately 22 GHz bandwidth signal, and wherein at least another one of the predefined filter states causes the filter bank to tune an approximately 0.5 GHZ bandwidth signal.

* * * * *